METAL PLATED NON-CONDUCTIVE SUBSTRATES

Original Filed June 29, 1966

Inventors:
John H. Lupinski,
Jerome J. Hertz,
by James H. Underwood
Their Agent.

United States Patent Office 3,481,840
Patented Dec. 2, 1969

3,481,840
METAL PLATED NON-CONDUCTIVE SUBSTRATES

John H. Lupinski, Scotia, N.Y., and Jerome J. Hertz, Broomall, Pa., assignors to General Electric Company, a corporation of New York Application June 29, 1966, Ser. No. 561,487, now Patent No. 3,424,698, dated Jan. 28, 1969, which is a continuation-in-part of application Ser. No. 391,765, Aug. 24, 1964. Divided and this application May 8, 1968, Ser. No. 727,499
Int. Cl. C23b *5/64, 5/18;* B32b *15/08*
U.S. Cl. 204—30 8 Claims

ABSTRACT OF THE DISCLOSURE

This invention relates to metal plated nonconductive substrates. In order to plate the substrate it is first made conductive in the areas to be plated by coating with nitrogen-containing polymers which are polymeric urethanes, polymers of vinylpyridine, polymers of acrylonitrile, polymers of methacrylonitrile, etc., containing dissolved therein, salts of 7,7,8,8-tetracyanoquinodimethan and uncombined 7,7,8,8-tetracyanoquinodimethan. These conductive coatings are copper plated, and, if desired, thereafter plated with any other metal, to produce either decorative or utilitarian objects.

This application is a division of our application, Ser. No. 561,487, filed June 29, 1966 now U.S. Patent 3,424,698, which is a continuation-in-part of our application, Ser. No. 391,765, filed Aug. 24, 1964, now abandoned, and assigned to the same assignee as the present invention.

This invention relates to metal plated nonconductive substrates using polymeric compositions possessing electronically conductive properties to provide a conductive surface on the substrate and to a process of producing plated objects. More particularly, this invention relates to copper plated non-conductive substrates, which can thereafter be plated with any one or more desired metals using a composition comprising a nitrogen-containing polymer which may be a polymeric urethane, polymers of vinylpyridine, polymers of acrylonitrile, polymers of methacrylonitrile, or mixtures or copolymers thereof, a salt of 7,7,7,7-tetracyanoquinodimethan soluble in the said polymer and a sufficient quantity of 7,7,7,7-tetracyanoquinodimethan to give the composition a conductivity greater than $10^{-10}$ mho. per centimeter, to provide the conductive surface on the substrate and to a process of producing plated objects.

Synthetic polymers, as a general class, are electrical insulators. In fact, it was this property which gave birth and strong impetus to the development of the synthetic polymer industry, since there was a need for materials which could be used as electrical insulation. With the development of the electrical industry, need arose for materials which, although not as good conductors as metals, would have conductive properties which could be used, for example, as corona shields, or could be incorporated as a separate layer in the insulation to prevent corona discharge which is undesirable since it causes complete breakdown of the electrical insulation. Also, with the development of the synthetic polymer industry, use of these materials in applications other than electrical applications arose for decorative and utilitarian purposes, for example, synthetic fibers and films.

Because of the electrical insulating nature of these polymers, articles fabricated from such fibers and films have the annoying property of building static charges on their surfaces, which tend to cause dust from the air as well as to cause other materials to cling to their surfaces.

Many attempts have been made to provide such articles with a surface which would dissipate the electrostatic charge so that the articles would not be so prone to build up static charges. Conductive surfaces are also desirable for electroplating non-conductors fabricated of these materials for decorative and utilitarian purposes, for example, decorative designs, printed circuits, etc. Applications have also arisen where it is desirable to make compositions such as conductive fabrics, especially in the form of conductive tapes which have a particular conductivity so as to control the amount of electric current flowing in the circuit incorporating such a composition.

Many attempts have been made to develop synthetic polymers which would be electronically conductive. When synthetic ion exchange resins were developed, it was hoped that these products would find application for conductive polymers. However, it was soon discovered that under the influence of electrical potential, much of the conductivity was ionic in which the ionic groups of the polymer migrated either toward the anode or cathode depending on the particular charge of the ionic group in the polymer. This is an undesirable property, since it depletes the ionic groups from the internal structure of the polymer with a consequent increase in resistance and degradation of the polymer.

Other approaches to the problem have been to incorporate metallic or other conductive fillers such as carbon blacks in polymers, to produce compositions having conductive properties. Since the amount of filler determines the conductivity of the composition, the conductivity of such compositions is dependent upon the highest amount of the conductive filler which can be incorporated in the composition without adversely affecting the mechanical properties of the compositions. These compositions also have the disadvantage that, although they are electrically conductive, they also have some electrical resistance which generates heat in the composition on the passage of an electrical current through them. On heating, these compositions expand, which in effect moves the conductive particles further apart, decreasing the conductivity of the composition and correspondingly increasing the resistance which in turn has the effect of producing more heat until the composition fails, due to thermal decomposition.

Our invention may be better understood by reference to the following description, taken in connection with the drawing, in which.

Figure 1:
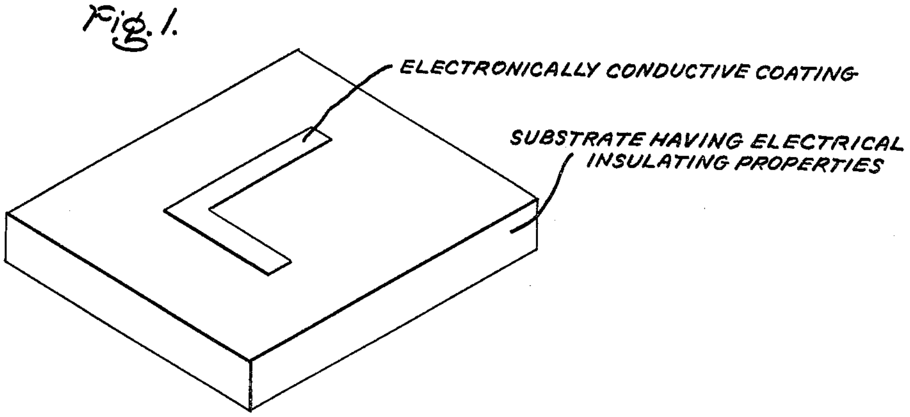
FIG. 1 is an isometric view of a substrate having electrical insulating properties on which a design has been formed within the scope of the present invention.

We have now discovered that electronically conductive polymers whose conductivity increases with temperature can be made using the unique compound 7,7,8,8-tetracyanoquinodimethan, hereinafter, for the sake of brevity, designated as TCNQ. This compound, its preparation, and the preparation of various salts of this compound, are described in J. Am. Chem. Soc., 85, 3370–3387 (1962). We have found that nitrogen-containing polymers such as polymers of acrylonitrile, polymers of methacrylonitrile, polymers of vinyl pyridine and polymeric urethanes in the solid state have the unique property of dissolving salts of TCNQ and TCNQ itself in the free state and that when sufficient quantities of these materials are dissolved in the polymer structure in the solid state these solid polymers are electronically conductive and metals can be electroplated thereon. Surprisingly, we have found that other nitrogen-containing polymers, for example, polyamides, do not have this property.

When the amount of TCNQ salt is at least 1% and the amount of free TCNQ is at least 0.5% by weight of the total composition, the conductivity of these polymeric compositions suddenly increases to produce a composition having a conductivity greater than $10^{-10}$ mho./centimeter. For most applications, it is desirable to use these compositions in the form of surface coatings, films or fibers. Therefore, the molecular weight of the polymers incorporating these TCNQ salts and TCNQ should be great enough that the polymer has film and fiber forming properties or can be used as a surface coating.

The polymers of vinylpyridines (e.g., 2-, 3-, or 4-vinylpyridine, etc.), acrylonitrile and methacrylonitrile are well known. These can be either homopolymers of copolymers in which the vinylpyridine, acrylonitrile or methacrylonitrile or mixtures thereof are copolymerized with other polymerizable monomers. The polymers of vinylpyridines may have from 1 to 2 lower alkyl substituents on the pyridine ring, in addition to the vinyl group, e.g., polymers of methyl-vinylpyridine, dimethyl-vinylpyridines, ethyl-vinylpyridines, methyl-ethyl-vinylpyridines, etc. However, since the ability to dissolve the TCNQ salts and TCNQ is apparently dependent upon the polymers having groups containing nitrogen, we generally prefer to use those polymers in which the vinylpyridine, acrylonitrile or methacrylonitrile or mixtures thereof are the preponderant ingredient, i.e., greater than 50% of the polymer molecule is a vinylpyridine, acrylonitrile, methacrylonitrile or a mixture thereof. Polymeric urethanes are likewise well known and as a general class are made by the reaction of a dihydric alcohol with a diisocyanate. Generally, the dihydric alcohol is in the form of a polyether or polyester having a terminal hydroxyl group which is chain-extended with the diisocyanate, the isocyanate group reacting with the hydroxyl group to give a carbamic ester group, commonly referred to as a urethane group. A detailed description of polyurethanes is found in the book "Polyurethanes," by B. A. Dombrow, Reinhold Publishing Corporation, New York (1957).

The TCNQ salts may be any of the various known simple salts of TCNQ represented by the simple salt formula $M^{n+}(TCNQ^-)_n$, in which M may be a metallic or organic cation, and $n$ is the valence of the cation, or they may be a complex salt as represented by the formula $M^{n+}(TCNQ^-)_n \cdot (TCNQ)$, which contain a molecule of neutral TCNQ in addition to the TCNQ ion. In this formula, M and $n$ are as described previously. When the simple salts are used in our invention, additional free TCNQ must be added to produce the desired conductivity in the polymeric composition. Since the complex salts already contain free TCNQ, no additional TCNQ need be added when the complex salts are used to add to our polymeric compositions. M may be a wide variety of metal ions, such as lithium, sodium, potassium copper, iron, manganese, barium, cesium, cobalt, lead, nickel, chromium, etc., or it may be an organic cation, for example, various amines, ammonia, alkyl ammonium cations, etc. These various TCNQ salts are fully described and their method of preparation given in the above-referred to J. Am. Chem. Soc. article.

In addition to the TCNQ salts listed in this article, we may also use the polymeric salts which TCNQ forms with polymers containing quaternary nitrogen cation groups disclosed and claimed in the copending application of Lupinski and Kopple, Ser. No. 391,764, now U.S.

Patent 3,346,444 filed Aug. 24, 1964 and assigned to the same assignee as the present invention. These polymer-TCNQ salts are produced by reacting a soluble polymer containing quaternary nitrogen cation groups with a soluble salt of TCNQ. The most soluble and readily available salt is the lithium salt of TCNQ. The polymeric salt of TCNQ is insoluble in the solvent which is generally water, methanol, ethanol, or a mixture thereof, whereby the polymer-TCNQ salt precipitates leaving the lithium or other salt formed as a by-product of the reaction still in solution.

The TCNQ salt and the TCNQ may be incorporated into the above polymers by any suitable means. We generally prefer, if the polymer is soluble, to dissolve the polymer, the TCNQ salt, and the TCNQ in a mutual solvent to form a homogeneous solution, or to separately dissolve these materials and blend the solutions to form a homogeneous solution of the three components. These solutions can then be used to cast films or to spin fibers or may be used as coating compositions to produce compositions having electronically conductive properties. If the polymer is insoluble in any solvent or is insoluble in the solvent used for dissolving the TCNQ salt and TCNQ, the TCNQ salt and TCNQ can be diffused into the polymer by contacting the polymer with a solution of the TCNQ salt and free TCNQ permitting a sufficient time for the TCNQ salt and the TCNQ to diffuse into the polymer. If a solvent is used which, although it does not dissolve the polymer, does swell the polymer, then the time necessary for diffusion of the TCNQ salt and TCNQ into the polymer is greatly shortened.

In either case, on evaporation of the solvent, the TCNQ salt and TCNQ remain dissolved in the polymer up to the solubility limit of these materials in the polymer. The conductivity of the resulting composition increases as the concentration of the TCNQ salt and TCNQ increases. Generally, concentrations as great as 15–20% of combined weight of the TCNQ salt and TCNQ may be attained before there is any evidence of crystals of these two materials appearing in the polymer matrix. However, the conductivity of those compositions containing crystals of the TCNQ salt or TCNQ is not adversely affected. In fact, the conductivity continues to increase as a function of concentration. On the other hand, the dissolved phase of TCNQ salt and TCNQ in the polymer phase is a prerequisite. If only the insoluble crystalline phase is present, the conductivity of the polymer is greatly decreased. Insofar as we can determine, polymers of acrylonitrile, polymers of vinylpyridine, polymers of methacrylonitrile, and polymeric urethanes are the only polymers capable of retaining TCNQ salts and TCNQ as a dissolved phase in the absence of a mutual solvent, i.e., in the solid state. Solutions of closely related nitrogen-containing polymers, for example, polyamides, can be made containing dissolved TCNQ salts and TCNQ. However, on evaporation of the solvent, the TCNQ salts and TCNQ crystallize out as a separate phase in the polymer matrix leaving none in the dissolved phase. As a consequence, the polymers have a very low conductivity.

The technique of diffusing the TCNQ salt and TCNQ into the polymer is a very useful technique to use when it is desired to produce only a conductive surface on the fabricated article, while leaving the internal structure of the polymer in its original non-conductive condition. This technique is also useful in producing conductive polymers from those polymers which have been already fabricated into the desired shape or which have been cross-linked and therefore rendered insoluble in solvents. This technique can also be used for making fibers electronically conductive which have been spun from the dissolved polymer for example, polyacrylonitrile fibers or cross-linked fibers, for example, fibers from polymeric urethanes.

Typical solvents that can be used to dissolve polymers of acrylonitrile are dimethylformamide, dimethyl acetamide, dimethyl sulfoxide, butyrolactone, α-cyanoacetamide, etc. Copolymers containing a major proportion of acrylonitrile are often soluble in solvents such as dioxane, chlorobenzene, cyclohexanone, methyl ethyl ketone, as well as the above solvents. Polymers of the vinylpyridines and methacrylonitrile are readily soluble in solvents such as cyclohexanone, nitromethane, nitropropane, as well as the solvents for polymers of acrylonitrile. Diethyl sulfone is a particularly good solvent to use with polyacrylonitrile where it is only desired to swell but not dissolve the polymer. By use of a mixture of a solvent and a non-solvent, it is also possible to obtain a solvent mixture which will swell but not dissolve the polymers of our invention, which are soluble in the solvent.

Polymeric urethanes may be made with a wide variety of properties and range all the way from thermoplastic, soluble polymers to those which are cross-linked to varying degrees, depending on the ingredients used in preparing the polymeric urethanes. If only a dihydroxy compound and diisocyanate are used, the polymers are thermoplastic and readily soluble in a wide variety of solvents. Cross-linked insoluble products are produced by substitution of either a polyhydroxy compound containing more than 2 hydroxyl groups for at least part of the dihydroxy compound or a polyisocyanate containing more than 2 isocyanate groups for part or all of the diisocyanate compound. Many of the polymeric urethanes, readily available as commercial products, are made by using a dihydroxy compound which is either a polyester or a polyether having molecular weights in the general range of 500–5,000 which are then reacted with a diisocyanate to produce a high molecular weight polymeric urethane that can be cross-linked if desired by incorporation of either a small amount of trihydroxy compound such as glycerine, trimethylolpropane, sorbitol, etc., or a small amount of a polyisocyanate containing more than 2 isocyanate groups. Further reaction converts the polyurethanes into cross-linked products. The thermoplastic polymeric urethanes are readily soluble in common solvents such as toluene, benzene, ethyl acetate, etc. The polymeric urethanes which are cross-linked are not soluble in any of the solvents, but may be swollen in the solvents such as dimethylformamide, dimethylcyanamide, etc.

The solubility of the TCNQ salts depends upon the particular TCNQ salt. However, solvents such as dimethylformamide, dimethylcyanamide, etc., are readily available solvents which dissolve both the TCNQ salt and the TCNQ. These solvents are likewise either good solvents for dissolving the polymers or swelling the insoluble polymers to introduce the TCNQ salt and the TCNQ into the polymer.

Generally, it is possible to more readily incorporate a larger quantity of the TCNQ salt and TCNQ into those polymers which are soluble. Therefore, when it is desired to produce compositions which have the gretaest conductivity, we prefer to use those polymers which are soluble. However, sufficient TCNQ salt and TCNQ can be diffused readily into those polymers which are insoluble, so that they have conductivities greater than $10^{-10}$ mho./centimeter in the area where the diffusion has occurred.

The amount of TCNQ salt and TCNQ to be incorporated in the polymer matrix is dependent on the conductivity desired and the particular TCNQ salt used. Generally, we have found that to obtain conductivities greater than $10^{-10}$ mho./centimeter the TCNQ salt should be at least 1% and the TCNQ should be at least 0.5% of the total weight of the final solid polymer composition. As the examples illustrate, the amount of TCNQ salt and TCNQ that is needed to give a particular conductivity in a polymer is readily determined by incorporating varying amounts of these two components and measuring the conductivity. A graphical plot of this data then permits the determination of the conductivity of polymers containing other concentrations of these two materials.

The addition of a TCNQ salt having TCNQ present only as TCNQ anions is not sufficient. Either a complex salt containing neutral TCNQ, i.e., TCNQ in the free or non-ionic form, in addition to the TCNQ anion incorporated in the salt, or a TCNQ plus a simple TCNQ salt, i.e., a salt containing TCNQ only in the form of TCNQ anions must be used. In other words, both the presence of TCNQ and TCNQ anions are essential to the making of our conductive polymers.

Since the compositions are electronically conductive, they may be used as the cathode in a plating bath and an adherent metal deposit plated on to the composition. Because of the chemical makeup of the composition, neutral to slightly acidic baths should be used. Strongly acidic baths appear to have a deleterious affect on the coating before sufficient metal is deposited to protect the film. Alkaline baths do not give deposits of the metal probably because of formation of salts with some component, probably the free TCNQ, of the conductive composition. This does however quite often lead to the production of a brightly colored adherent coating of undefined composition. Of all the metals which can be plated from neutral to slightly acidic baths, only copper gives a consistently good electrodeposit. Silver gives a thin deposit of silver but it tends to form rough coatings in thicker deposits. However, once a copper layer has been deposited any other metal can be plated on top of the copper by electrodeposition from acid or alkaline baths, by electroless plating techniques, vapor deposition, sputtering, etc. Best results are obtained by using an aqueous solution of a copper salt which has been slightly acidified by addition of a few ml. of acid per liter of solution. Best results are obtained by immersing the junction between the piece to be plated and the current source. Plating starts at this junction and spreads over the balance of the conductive surface. Surprisingly no noticeable difference in the thickness of the copper is noticed over the plated area.

Solutions of the electronically conductive compositions of this invention can be prepared and used to form an electronically conductive coating on a non-conductive object, i.e., on a substrate having electrical insulating properties, for example plastic laminates, cast or molded plastic articles, natural and synthetic fibers and mast and woven fabrics made of such fibers, etc. Such coated compositions can be used, as such, because of their electronically conductive properties or they may be used as the substrate on which copper is electroplated as described above and, if desired, another metal deposited on the copper. These aspects of the invention are illustrated in the drawing.

FIG. 1 illustrates one embodiment of our invention whereby a decorative design, for example a letter, is formed on a non-conductive substrate. In making the design, the non-conductive substrate may be coated with the conductive polymer described herein, only in those areas where the copper is to be deposited or a greater area may be coated and then masked so that the copper will only be deposited where desired. This latter technique would have some of the conductive polymer surface unplated by the copper. In the making of an electrical circuit, e.g., a printed circuit board, by the technique of this invention, it would generally not be desirable to have the unplated conductive polymer coating bridge between and short-circuit the plated circuit. However, such a technique of using both unplated and metal plated conductive circuits can be used to take advantage of the difference in conductivity, e.g., in a shunt.

Instead of plating a design, the entire exposed area of an object, e.g., a knob, handle, fiber, rod, etc., may be electroplated with copper, and then if desired by another metal, e.g., silver, nickel, chromium, gold, platinum, zinc, brass, cobalt, etc.

Figure 2:
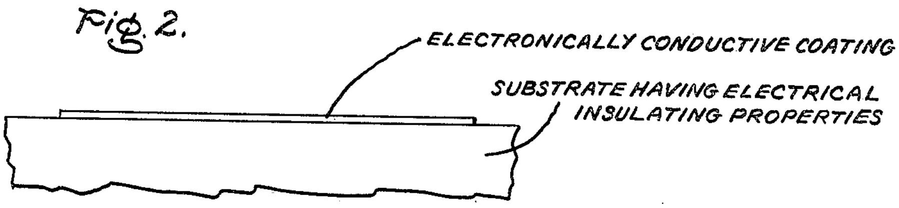
FIG. 2 is a cross-sectional view of a substrate having electrical insulating properties, having on its surface an adherent coating, enlarged to show detail, of the electronically conductive polymer within the scope of the present invention.
Figure 3:
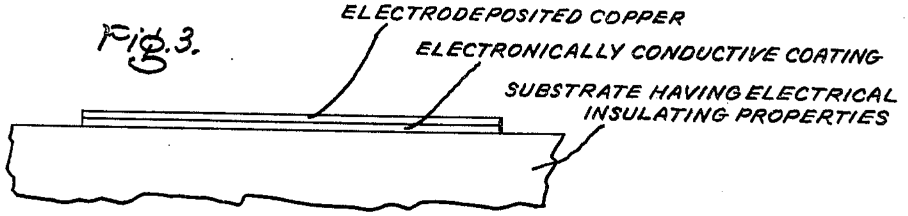
FIG. 3 is a cross-sectional view of a substrate having electrical insulating properties, having on its surface an inherent coating of electronically conductive polymer upon which an adherent coating of copper has been deposited within the scope of the present invention.
Figure 4:
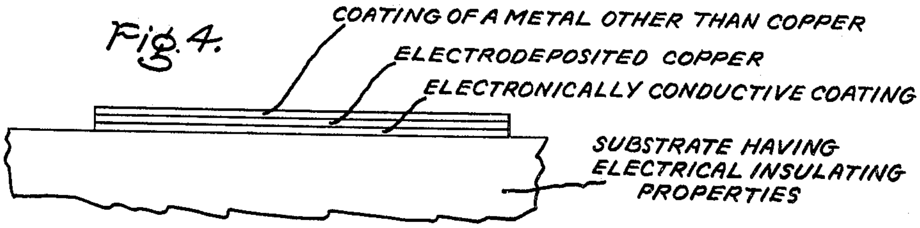
FIG. 4 is a modification of FIG. 3 in which an adherent coating of a metal other than copper has been deposited on the copper within the scope of the present invention.

FIGS. 2, 3 and 4 illustrate certain of the above described embodiments of our invention. In these figures the thickness of the layers have been greatly enlarged for clarification.

FIG. 2 shows the electronically conductive coating applied to selected area of the surface of a substrate having electrical insulating properties i.e., a nonconductive base member. The actual area covered by the coating can be any that is desired to form plain or intricate designs.

As such it can be used as an electrical circuit on the insulating base member or plated with copper to form decorative patterns or useful designs such as printed circuits. The electronically conductive coating can be deposited by spraying, brushing, printing, silk screening or any other desired technique used for surface coating.

FIG. 3 shows the embodiment of FIG. 1 with a copper coating electrodeposited thereon. Any desired neutral (i.e., no base or acid added) but preferably slightly acidic, aqueous solution of a copper salt, preferably of a mineral acid, may be used, with ordinary electroplating techniques for copper coating. Only those portions of the surface which have been coated with the electronically conductive coating will be plated. As mentioned previously even the coating may be partially masked so that only certain portions will be coated with copper. It is not known why only copper can be electrodeposited on this electronically conductive coating. Attempts to plate chromium, nickel, tin, cadmium, etc. have not been successful. Silver has only been plated in thin coatings. However, once the copper coating has been formed, these other metals are readily plated with no trouble on to the copper as illustrated in FIG. 4. Bright copper, using strongly acidic baths may also be used to form a very bright copper coating. These other metals may be deposited on the copper by electroplating from either acidic or basic plating baths recommended for the particular metal. Since copper will automatically plate metals from electroless plating solutions, such solutions may also be used to deposit the other metals. Likewise any other method may be used to deposit these other metals on copper, e.g., vacuum deposition, sputtering, flame spraying, etc. However, for the smoothest and most tenaciously bonded coats we prefer to electroplate these other metals on the copper layer.

In the claims we intend that the terminology calling for a salt of 7,7,8,8-tetracyanoquinodimethan soluble in the polymer and 7,7,8,8-tetracyanoquinodimethan to include within its scope the addition of a complex salt with or without further addition of TCNQ, as well as the addition of TCNQ and a salt containing TCNQ only as TCNQ anions.

In order that those skilled in the art may better understand our invention, the following examples are given by way of illustration and not by way of limitation. In all the examples, parts and percentages are by weight, unless otherwise specifically stated.

EXAMPLE 1

This example illustrates the use of a simple TCNQ salt having only a metal cation and a TCNQ anion used in conjunction with additional TCNQ. A stock solution containing 100 g. of polyacrylonitrile per liter of dimethylformamide was prepared. To portions of this stock solution sufficient quantities of the lithium salt of TCNQ and TCNQ were added to give 5% of the lithium salt of TCNQ and 0, 1, 2, 4 and 5% by weight of the TCNQ based on the combined weight of the dry polymer, the lithium salt of TCNQ and TCNQ. Films were cast from these solutions, and the conductivity measured after evaporation of the solvent. The results are shown in Table I.

TABLE I

| Percent Li TCNQ | Percent TCNQ | Conductivity at 27° C. mho./centimeter |
|---|---|---|
| 0 | 0 | $<10^{-10}$ |
| 5 | 0 | $<10^{-10}$ |
| 5 | 1 | $4.0\times10^{-5}$ |
| 5 | 2 | $3.3\times10^{-5}$ |
| 5 | 4 | $3.6\times10^{-5}$ |
| 5 | 5 | $5.0\times10^{-5}$ |

Similar results are obtained when methacrylonitrile is used in place of the acrylonitrile.

To demonstrate how the conductivity of these compositions increases with temperature, the conductivity of the film containing 5% of the lithium salt of TCNQ and 5% TCNQ was measured at from room temperature up to 190° C. The data shown in Table II are typical of the results.

TABLE II

| Temp. ° C.: | Conductivity mho./centimeter |
|---|---|
| 27 | $5.0\times10^{-5}$ |
| 60 | $9.1\times10^{-5}$ |
| 100 | $1.8\times10^{-4}$ |
| 125 | $2.7\times10^{-4}$ |
| 150 | $3.6\times10^{-4}$ |
| 190 | $4.2\times10^{-4}$ |

EXAMPLE 2

This example illustrates the use of a complex TCNQ salt in which the salt as formed contains free TCNQ as part of the complex salt. It is therefore not necessary to add additional TCNQ in forming the conductive compositions over and above the TCNQ which is included as part of the complex salt. The complex TCNQ salt of quinoline was prepared by dissolving 1.6 g. of TCNQ in 25 ml. of acetonitrile and adding a solution of 0.4 g. of quinoline and 0.4 g. of p-phenylenedimalononitrile, the dihydro-reduced form of TCNQ, in 30 ml. of acetonitrile. After stirring for 2 hours at room temperature, the quinoline complex salt of TCNQ had precipitated. This salt has one quinoline cation associated with one TCNQ anion and one molecule of TCNQ. It was filtered from the solution and washed with acetonitrile followed by dry ether and then dried. A yield of 87% of theory was obtained.

This quinoline TCNQ salt was added to the stock solution of polyacrylonitrile described in Example 1 to give concentrations of 1, 2, 5, 10, 15 and 20% by weight based on the solids content of the solutions. Films were cast from these solutions and the conductivities measured. The results are shown in Table III.

TABLE III

| Percent Complex Quinoline Salt of TCNQ: | Conductivity at 27° C. mho./centimeter |
|---|---|
| 1 | $<10^{-10}$ |
| 2 | $2.0\times10^{-3}$ |
| 5 | $2.0\times10^{-3}$ |
| 10 | $8.7\times10^{-2}$ |
| 15 | 2.0 |
| 20 | 2.7 |

Examination of the X-ray diffraction patterns of these films showed that the film containing 20% of the complex quinoline salt contained microcrystals, indicating that some of the salt had precipitated as a crystalline phase.

In place of the complex quinoline salt of TCNQ, the simple quinoline TCNQ salt plus TCNQ can be used. The corresponding concentrations of the simple quinoline TCNQ salt and TCNQ corresponding to the concentrations shown in Table III of the complex salt are shown in Table IV.

TABLE IV

| | Corresponding to— | |
|---|---|---|
| Percent Complex Quinoline Salt of TCNQ | Percent Simple Quinoline Salt of TCNQ | Percent TCNQ |
| 1 | 0.62 | 0.38 |
| 2 | 1.24 | 0.76 |
| 5 | 3.10 | 1.90 |
| 10 | 6.20 | 3.80 |
| 15 | 9.30 | 5.70 |
| 20 | 12.40 | 7.60 |

Conductive fibers can be prepared as well as films from the above solutions as illustrated by the following. A solution of 0.19 g. of polyacrylonitrile and 0.04 g. of the complex quinoline salt of TCNQ in 2.5 ml. of dimethylformamide was spun through a spinnerette into a bath containing 90% benzene and 10% dimethylformamide. As the fine stream of the solution entered this bath, the polymer coagulated as a fiber. After drying, the fiber was electrontrically conductive. Its conductivity was essentially that of the film containing the same amount of the complex quinoline salt of TCNQ.

EXAMPLE 3

Spandex fibers of two commercially available polymeric urethanes, 40 centimeters long x 0.27 millimeters in diameter weighing 31.2 milligrams were placed in a solution of 0.0135 g. of the complex quinoline salt of TCNQ in 5 ml. of dimethylformamide. The spandex fibers are a long-chain synthetic polymer comprising at least 85% of a segmented polyurethane. One fiber was typical of the fiber made by first making a hydroxy-terminated polyurethane from poly(1,4-oxybutylene)glycol (M.W. ca. 1000) and toluene diisocyanate then converting it to an isocyanate-terminated product with 4,4′-diphenylmethane diisocyanate then reacting it with an aliphatic diamine, e.g., ethylene diamine, hexamethylene diamine, etc., and wet-spinning the solution of the resulting high molecular weight urea extended polyurethane into a fiber. The other fiber was typical of the fiber made by first making a hydroxy-terminated mixed polyester of adipic acid, ethylene glycol and propylene glycol then converting it to a liquid polyurethane with 4,4′-diphenylmethane diisocyanate which is extruded as a fine stream into a bath containing an aliphatic diamine, e.g., ethylene diamine, hexamethylene diamine, etc., to convert the outer surface of the fiber to a solid urea extended polyurethane. The inner core of the fiber is converted to a solid, urea extended polyurethane by diffusion of water into the core.

The fibers were insoluble but did swell. After 10 minutes in this solution at 23° C., the fibers were withdrawn and the solvent allowed to evaporate. Weighing the dried fibers showed that they had increased in weight by 5%. They had a conductivity of $10^{-7}$ mho./centimeter in the unstretched state. As these fibers were stretched, the conductivity decreased in proportion to the amount of stretch.

The fibers of Examples 2 and 3 can be woven alone or mixed with other kinds of fibers to give electronically conductive fabrics and tapes.

EXAMPLE 4

This example illustrates the use of a polymer-TCNQ salt. Polyvinylpyridine was quaternized by reacting 10 g. of polyvinylpyridine dissolved in 400 ml. of methanol with 10 g. of dimethyl sulfate for 2 days at 60° C. to give a partially methylated polymer. The solution was concentrated to one-half its original volume, and then diluted to 1 liter with water; 60 ml. of dimethyl sulfate was added over a period of 3 hours, with vigorous stirring at room temperature. The pH was maintained above 8 by periodic addition of alkali. At the end of this time, the polymer had completely dissolved. An additional 10 ml. of dimethyl sulfate was added and the reaction allowed to continue overnight. The reaction mixture was dialyzed against water to remove salts and then lyophilized (free-dried, i.e., the solution frozen and solvent evaporated under vacuum while maintaining the solution in the frozen condition). Analytical data showed that all of the nitrogen atoms in the pyridine nuclei of the polymer had been quaternized. A solution of 1 g. of the fully quaternized polymer in 15 ml. of dimethylformamide was mixed with a solution of 1.2 g. of lithium salt of TCNQ in 15 ml. of dimethylformamide. The mixture was stirred until a homogeneous solution was obtained, after which 50 ml. of distilled water saturated with nitrogen was added to the solution while maintaining a nitrogen atmosphere over the reaction mixture. A precipitate of the polymer-TCNQ salt formed immediately. It was removed by filtration, washed thoroughly with water, alcohol and then ether and dried in vacuum, yielding 1.1 g. of the TCNQ salt of the quaternized polymer. A solution in dimethylformamide was made containing polyacrylonitrile, the polymer-TCNQ salt and TCNQ in proportions such that a film cast from this solution contained 70% polyacrylonitrile, 25.5% of the polymer-TCNQ salt, and 4.5% TCNQ. This was a strong, flexible film having a conductivity of $9\times10^{-7}$ mho./centimeter measured at 27° C.

Other polymer-TCNQ salts such as the TCNQ salt of quaternized polymers of ethyleneimine, quaternized polyphenylene ethers, quaternized polymers of vinylimidazoles etc., can be used as replacements for the quanternized polymer of vinylpyridine of the above examples.

EXAMPLE 5

An approximately 10% solution of a soluble, thermoplastic, polymeric urethane comprising a polyester of 1,4-butanediol and adipic acid chain extended with 4,4′-diphenylmethane diisocyanate, and the complex quinoline salt of TCNQ in the proportion of 8.5 g. of the former to 1.5 g. of the latter was made using dimethylformamide as the solvent. A film cast from this solution, after evaporation of the solvent, had a conductivity at 27° C. of $1\times10^{-2}$ mho./centimeter.

EXAMPLE 6

Example 5 was repeated but using polyvinylpyridine in place of the polymeric urethane. The film had a conductivity of $1.2\times10^{-4}$ mho./centimeter.

EXAMPLE 7

Example 5 was repeated except the polymer was a mixture of polyacrylonitrile and polyvinylpyridine and the proportions were such that the cast film was 46.3% polyacrylonitrile, 15.1% polyvinylpyridine and 38.6% complex quinoline salt of TCNQ. This film had a conductivity at 27° C. of $1.2\times10^{-1}$ mho./centimeter. In place of the mixed polymer a copolymer of acrylontrile and polyvinylpyridine can be used.

When an electric current is passed through the conductive compositions of this invention for a sufficient time that complete electrolysis of the TCNQ salt would have occurred, if conductivity had been ionic, it was found that no decrease in conductivity occurs, showing that the conductivity is electronic.

EXAMPLE 8

This example illustrates the making of metal plated articles.

A solution of 0.115 g. of the polyurethane of Example 5 in 3 ml. of dimethylformamide was prepared. A solution of 0.115 g. of the complex quinolinium salt of TCNQ in 100 ml. of acetone and 2 ml. of dimethylformamide was also prepared. The two solutions were thoroughly mixed and filtered. Using an artist's air brush, an area of between 25 to 100 sq. in. can be spray coated with two coats using 10 ml. of this solution to give a film 0.1 mil thick. Each coat is vacuum dried at ambient temperature for 15 to 30 minutes. Such a film is smooth and very adherent to all plastic surfaces, e.g., molded phenolic, urea, melamine, the paper and cloth base, laminates of these resins, polycarbonate resins, polyethylene, polypropylene, polyacrylates, polymethacrylates, polyvinyl halide, etc. resins. In some cases, different solvents must be used for the spraying of the electronically conductive coating because of the effect of solvent on the plastic. For example, polycarbonates can not tolerate acetone or dimethylformamide, in which case a mixture of pyridine and tetrahydrofuran can be used. We have successfully used a mixture of 25% pyridine and 75% tetrahydrofuran for coating polycarbonates with the conductive coatings of this invention. Usually to improve adhesion it is desirable to sandblast or otherwise roughen the surface before applying the coating.

Sample A

The above solution was used to coat both sides of a paper base phenolic laminate 2.5 cm. by 4.5 cm. One side had been sandblasted. The weight of the coating was 5.7 mg. and was 0.1 mil thick.

Sample B

A similar panel was made but which was coated with the same polyurethane resin but made conductive using carbon black in the proportion of 1 part carbon black for each 2 parts of resin. In this case the film necessary to give a continuous coat was 1.8 mils thick and weighed 100 mg. Because of this greater thickness the apparent resistance per inch was much less.

Both of these panels were electroplated with copper using a continuously filtered saturated copper sulfate solution, and a copper anode. The voltage was maintained constant at 2 volts. At the end of 30 minutes, Sample A had a copper coating weighing 566 mg. whereas Sample B, even after 46 minutes, only had a copper coating weighing 400 mg. Thus, even though the conductive coating of Sample A was very much thinner than that of Sample B it permitted copper to be deposited much more rapidly.

Surface roughness measurements of the surfaces, before applying the conductive coating, after applying the conductive coating and after copper plating showed that both the sandblasted and normal surfaces of Sample A were the same at all three stages while both urfaces of Sample B became progressively rougher, i.e., the copper coating of Sample A was as smooth as the original surface while the copper coating of Sample B was rougher than the original surface.

The addition of 1 to 2 ml. of concentrated sulfuric acid per liter of the above plating bath will result in a faster plating rate and more uniform anode corrosion during use.

Copper has also been successfully plated on our compositions from a plating bath composed of 5 g. of cupric oxide dissolved in fluoboric acid ($HBF_4$) and diluted to 50 ml. with water. Likewise polyacrylonitrile has been substituted for the polyurethane in making the conductive coating.

EXAMPLE 9

Using the technique described in Example 8 for preparing Sample A, phenolic molded knobs were plated with copper. Some of the copper plated knobs were plated using a commercially available bright copper plating solution, some with a bright nickel plating solution, some with a bright chromium plating solution, some with a silver plating solution. In all cases bright, adherent coating of these metals were obtained on the copper.

The conductive polymers of this invention have a wide variety of applications; for example, the elastomeric compositions may be used as sensors of pressure and tension applied to the elastomeric compositions. The solutions of these compositions can be used to apply conductive coatings to a substrate which is an electrical insulator. The conductive films and tapes woven of the conductive fibers may be used as corona shields, as conductors for making electrical circuits, as base members upon which metals are electroplated, for the making of electrical circuits in electrical devices, etc.

These and other modifications and uses of this invention which will be readily discernible to those skilled in the art may be employed within the scope of the invention. The invention is intended to include all such modifications and variations as may be embraced within the following claims.

What we claim as new and desire to secure by Letters Patent of the United States is:

1. A composition comprising a substrate having electrical insulating properties having, on at least a portion of its surface, an adherent coating of a composition comprising (1) a nitrogen-containing polymer selected from the group consisting of polymeric urethanes, polymers of vinylpyridines, polymers of acrylonitrile, and polymers of methacrylonitrile containing dissolved therein sufficient quantities of (2) a salt of 7,7,8,8-tetracyanoquinodimethan anions soluble in the polymer of (1), and (3) 7,7,8,8-tetracyanoquinodimethan to give the composition a conductivity greater than $10^{-10}$ mho. per centimeter, upon which copper has been electrodeposited.

2. A composition comprising the composition of claim 1 on which an adherent coating of another metal has been deposited on the outer surface of the copper.

3. The composition of claim 1 wherein the polymer of (1) is a polymer of acrylonitrile.

4. The composition of claim 1 wherein the polymer of (1) is a polymer of methacrylonitrile.

5. The composition of claim 1 wherein the polymer of (1) is a polymeric urethane.

6. The composition of claim 1 wherein the polymer of (1) is a polymer of vinylpyridine.

7. The process of making a copper coating on a substrate having electrical insulating properties which comprises coating the substrate, at least in the areas on which the copper is to be deposited, with the composition of claim 1 as defined by (1), (2) and (3) and thereafter electroplating copper on the desired areas from a neutral to slightly acidic aqueous solution of a copper salt.

8. The process of claim 7 wherein after the copper is deposited, an adherent coating of a metal other than copper is deposited.

References Cited

UNITED STATES PATENTS

| | | | |
|---|---|---|---|
| 3,115,506 | 12/1963 | Acker et al. | 260—348 |
| 3,162,641 | 12/1964 | Acker et al. | 260—286 |
| 3,346,444 | 10/1967 | Lupinski et al. | 161—213 |

FOREIGN PATENTS

| | | |
|---|---|---|
| 944,540 | 12/1963 | Great Britain. |

JOHN H. MACK, Primary Examiner

W. B. VANSISE, Assistant Examiner

U.S. Cl. X.R.

29—195; 204—38